(No Model.)
L. C. NEAL.
BICYCLE TIRE.
No. 573,907. Patented Dec. 29, 1896.
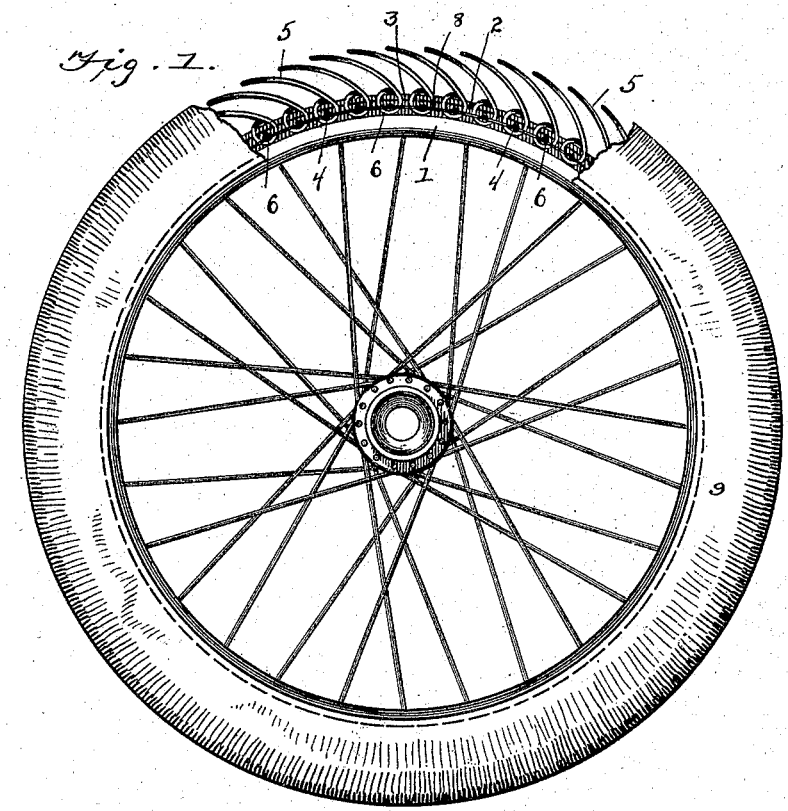
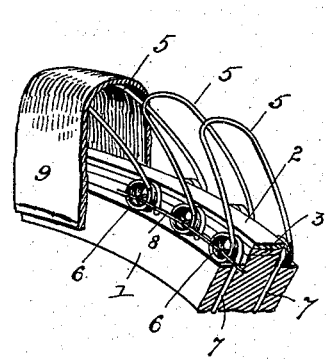
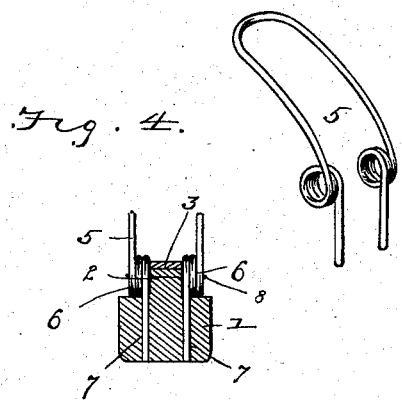
Inventor
Lemuel C. Neal,
Witnesses
By his Attorneys,

UNITED STATES PATENT OFFICE.

LEMUEL C. NEAL, OF LEWISTON, IDAHO.

BICYCLE-TIRE.

SPECIFICATION forming part of Letters Patent No. 573,907, dated December 29, 1896.

Application filed June 27, 1896. Serial No. 597,256. (No model.)

*To all whom it may concern:*

Be it known that I, LEMUEL C. NEAL, a citizen of the United States, residing at Lewiston, in the county of Nez Perces and State of Idaho, have invented a new and useful Bicycle-Tire, of which the following is a specification.

This invention relates to tires, being especially designed for use upon bicycles and other vehicles, and the object in view is to provide a mechanical tire resembling in action a cushion or pneumatic tire, the elasticity being obtained through the medium of a series of springs disposed around the wheel-rim and incased within a suitable sheath or cover, thus dispensing with the necessity for a pneumatic tire and avoiding the disadvantages of frequent puncturing and repair incident to the use of pneumatic tires.

To this end the invention consists in an improved tire for the purpose described, embodying certain novel features and details of construction and arrangement of parts, as hereinafter fully described, illustrated in the drawings, and incorporated in the claims.

In the accompanying drawings, Figure 1 is a side elevation of a wheel having the improved tire applied thereto, the outer sheath or cover being partly broken away to show the relative disposition of the springs. Fig. 2 is a fragmentary perspective view showing several of the springs and a portion of the wheel-rim. Fig. 3 is an enlarged detail perspective view of one of the springs. Fig. 4 is a detail cross-section through the wheel-rim, taken in line with the terminals of one of the springs.

Similar numerals of reference designate corresponding parts in the several figures of the drawings.

Referring to the drawings, 1 designates a wheel-rim which for the purpose of carrying out the present invention is provided upon its outer surface with a circumferential flange 2, extending longitudinally and centrally around the same. This flange may be formed either as an integral part of the rim or separately therefrom, and for the sake of imparting increased strength to the rim this circumferential flange is composed of a series of annular bands 3, of wood, metal, or other suitable material, the inner band being confined closely around the rim and the other bands being passed outside of and around such inner band in the manner shown in the drawings. These several bands together form the circumferential flange 2 and this flange is provided at numerous intervals with transverse perforations 4 for the passage of the lacing wires or cords hereinafter referred to.

The main body of the tire is formed and the elasticity thereof is obtained by means of a circumferential series of similarly-formed springs 5. Each of said springs is preferably formed from a section of wire. This section or blank is bent at its center into the U-form shown, such U-shaped bend forming the projecting and active end of the spring. The terminal portions of the blank are then extended in parallel relation and given a gradual curve, so as to cause them to assume a proximal tangential relation to the rim, whereby they may be the more easily compressed when weight is thrown thereon. The parallel portions of the springs, adjacent to the rim, are given one, two, or more coils 6, and these coils lie upon each side of the central circumferential flange 2, while the extremities of the terminals of the spring are extended inward into or through radial perforations or sockets in the rim, as shown at 7. The parallel portions of the springs are approximately flush or in the same planes with the side edges of the rim, while the extremities of the springs enter the rim close up to and on each side of the flange 2. This prevents any tendency of the springs or their coils to twist or move laterally as they have a constant bearing against the flange 2.

In order to prevent any possibility of the springs becoming displaced or unseated, one or more wires or cords 8 are rove or threaded through the transverse openings in the flange 2 and also around and about the coils 6 of the springs. These wires or cords hold the coils 6 firmly against the rim 1 and also against the flange 2. An outer case, cover, or sheath 9, of leather or other flexible material, extends around the rim and incloses the springs, and this cover or sheath may be connected to the rim in any desired manner, but preferably by means of lacing, the rim being for this purpose provided with a plurality of transverse perforations, through which suitable laces connected to the longitudinal edges of the cover or sheath 9 may be rove.

A tire constructed in accordance with the above description and as shown in the drawings possesses great elasticity and is very durable and at the same time is free from the liability to puncture. At the point where the tire contacts with the ground several of the springs, by reason of their flattening or compression, will form an increased bearing-surface, and as they spring back to their normal positions when weight is removed therefrom they will agitate the cover or sheath so as to shake the dirt therefrom, and will also give the wheel a forward impetus which will counteract the resistance to the forward motion of the wheel caused by the springs in the act of being compressed. By increasing or diminishing the number of coils 6 the resiliency of the tire may be correspondingly varied. The tire may be used without the sheath, if desired.

Various changes in the form, proportion, and minor details of construction may be resorted to without departing from the spirit or sacrificing any of the advantages of this invention.

Having thus described the invention, what is claimed as new is—

1. A wheel-tire composed of a circumferential series of springs each formed from a metal blank, the same being given a U-shaped bend at its central portion to form the free active end of the spring, and the terminal portions thereof being extended in substantially parallel relation, and having their extremities spaced apart and adapted to be inserted into the rim upon opposite sides of the center thereof, substantially as described.

2. A wheel-rim having a central circumferential flange upon its outer surface, in combination with a circumferential series of springs embracing said flange and having their terminals coiled adjacent to their extremities, with the coils seated upon opposite sides of said flange and the extremities of the springs inserted into the wheel-rim at each side of the flange, substantially as described.

3. A wheel-rim having a central circumferential flange extending around its outer surface and provided with transverse perforations, in combination with a circumferential series of springs having their inner ends arranged upon opposite sides of said flange, and a lace rove through said perforations and embracing said springs, substantially in the manner and for the purpose described.

4. The combination with a wheel-rim having a circumferential flange extending centrally around its outer surface, of a circumferential series of springs each having a U-shaped bend at its central portion embracing said flange, the terminals of the springs being seated upon either side of said flange, and a flexible sheath or cover surrounding and inclosing said springs and having its longitudinal edges attached to the rim, substantially as described.

In testimony that I claim the foregoing as my own I have hereto affixed my signature in the presence of two witnesses.

LEMUEL C. NEAL.

Witnesses:
AUGUST SCHIEBE,
THOS. MULLEN.